UNITED STATES PATENT OFFICE.

PETER LÖFFLER, OF VIENNA, AUSTRIA-HUNGARY.

PROCESS FOR THE MANUFACTURE OF SODIUM BISULFATE IN A DIRECTLY-CALCINABLE FORM.

1,104,913. Specification of Letters Patent. Patented July 28, 1914.

No Drawing. Application filed December 10, 1913. Serial No. 805,744.

*To all whom it may concern:*

Be it known that I, PETER LÖFFLER, manager, a subject of the Emperor of Germany, and a resident of Vienna, in the Empire of Austria-Hungary, (whose post-office address is Vienna, I. Kolowratring 6,) have invented Improvements in the Process for the Manufacture of Sodium Bisulfate in a Directly-Calcinable Form, of which the following is a specification.

Many attempts have already been made to produce the neutral sulfate from sodium bisulfate without the necessity of producing at the same time hydrochloric acid. According to one known process, the bisulfate is heated with carbon, whereby neutral sulfate is formed by the action of the heat, (see German patent specification No. 63189). It has also been proposed to replace a part of the carbon powder by sawdust with the intention of preventing an agglomeration of the mass, in the calcination process, (see British patent specification No. 6898 of A. D. 1904). It has, however, been attempted in vain to decompose the bi-sulfate by a process suitable for operations on a large scale, by means of heat alone without any additions. The reason for this is that bi-sulfate melts in the calcination process, and no apparatus is able to withstand permanently the action of molten bi-sulfate owing to the very high calcination temperature employed in the known process. It has been attempted to prevent the melting of the sodium bi-sulfate by subjecting it to the calcining operation in admixture with silica or silicates or any substance, that is not acted upon by bi-sulfate, for instance the anhydrous sulfates of sodium, potassium, calcium, or the like (see Austrian patent specification No. 29478). These attempts, however, have also led to no process suitable for commercial working, in consequence of the high calcination temperature and the incompletely obviated melting of the sodium bi-sulfate.

Now the improved process forming the subject of the present invention allows of producing sodium bi-sulfate in a form in which it can be calcined directly without additional substances without melting.

One form of the improved process consists in passing a gasifiable substance, preferably a carbonizable substance directly into the hot liquid sodium bi-sulfate drawn from the nitric acid retort and allowing this mixture to cool and set. This produces a violent evolution of gas and the liquid bisulfate sets with generation of gas to a loose spongy mass, which is characterized by a low specific gravity and great porosity. The production of the bi-sulfate in a porous form would seem to be due to the generation of vapor or gas caused by the introduction of vapor forming, or gas-generating substances.

The use of carbonizable substances, such as cellulose-containing materials, for instance sawdust, peat and the like, as gas generators, has the great advantage that carbon is incorporated with the bisulfate during the setting, which carbon acts as a reducing agent in the calcination of the bisulfate in the muffle, and is driven out in the form of carbonic acid. Consequently the porosity of the bisulfate increases during the calcination and therefore its melting tendency is still further diminished and moreover the calcination temperature is reduced by the action of the reducing agent, so that the calcination can be effected at the temperature normally existing in the sulfate muffle furnace.

The improved process is preferably carried into effect by stirring the hot sulfate which is drawn off into any suitable stirring apparatus in the nitric acid factory together with about 2 to 10% of sawdust or the like, and then allowing the mixture to cool in a cooling tank. Experiments have shown that the percentage of acid contained in the bisulfate is only inappreciably affected hereby. In the aforesaid cooling tank the bisulfate forms in the shape of a black spongy mass which turns white when calcined without melting, and which produces a neutral sulfate of normal composition.

Having now particularly described and ascertained the nature of my said invention and in what manner the same is to be performed, I declare that what I claim is:—

1. A process for producing sodium bisulfate in a directly calcinable form, which consists in mixing gasifiable substances of an organic nature with the hot liquid bi-sulfate, and then allowing the mixture to set, whereby porosity of the mass is produced by the gasification during setting so that the mass is rendered more easily calcinable.

2. A process for producing sodium bisulfate in a directly calcinable form, which consists in mixing cellulose-containing materials with the hot liquid bisulfate, and then allowing the mixture to set, whereby porosity of the mass is produced by the gasification during setting so that the mass is rendered more easily calcinable.

3. As a new product of manufacture sodium bi-sulfate in the form of a black spongy mass, which will burn white when calcined without melting and will produce a neutral sulfate of normal composition.

In witness whereof, I have hereunto signed my name in the presence of two subscribing witnesses.

Dr. PETER LÖFFLER.

Witnesses:
  HUGO KEIK,
  ADA MARIA BERGER.